United States Patent [19]
Acharya

[11] Patent Number: 5,875,122
[45] Date of Patent: Feb. 23, 1999

[54] INTEGRATED SYSTOLIC ARCHITECTURE FOR DECOMPOSITION AND RECONSTRUCTION OF SIGNALS USING WAVELET TRANSFORMS

[75] Inventor: Tinku Acharya, Tempe, Ariz.

[73] Assignee: Intel Corporation, Santa Clara, Calif.

[21] Appl. No.: 767,976

[22] Filed: Dec. 17, 1996

[51] Int. Cl.[6] .................................................. G06F 15/00
[52] U.S. Cl. ...................................................... 364/726.05
[58] Field of Search ....................... 364/726.05, 724.011

[56] References Cited

U.S. PATENT DOCUMENTS 5,245,433   9/1993   Sid-Ahmed et al. ..................... 348/571

OTHER PUBLICATIONS

"A Theory for Multiresolution Signal Decomposition: The Wavelet Representation"—Stephane G. Mallat, IEEE Transactions on Pattern Analysis and Machine Intelligence, (vol. II, No. 7, Jul. 1989).

"VLSI Architectures for Discrete Wavelet Transforms"—Keshab K. Parhi and Takao Nishitani, IEEE Transactions on VLSI Systems, (vol. I, No. 2, Jun. 1993).

*Primary Examiner*—Tan V. Mai
*Attorney, Agent, or Firm*—Blakely, Sokoloff, Taylor & Zafman LLP

[57] ABSTRACT

The invention provides an integrated systolic architecture which can perform both forward and inverse Discrete Wavelet Transforms with a minimum of complexity. A plurality of processing cells, each having an adder and a multiplier, are coupled to a set of multiplexers and delay elements to selectively receive a single input datastream in the forward DWT mode and two datastreams in the inverse DWT mode. In the forward DWT mode, the integrated architecture decomposes the input datastream into two output sequences—a high frequency sub-band output and a low frequency sub-band output. In the inverse DWT mode, the integrated architecture reconstructs the original input sequence by outputting even terms and odd terms on alternating clock cycles. As a result, the architecture can achieve 100% utilization and is suitable to be implemented in VLSI circuitry.

5 Claims, 6 Drawing Sheets

INTEGRATED SYSTOLIC ARCHITECTURE FOR DECOMPOSITION AND RECONSTRUCTION OF SIGNALS USING WAVELET TRANSFORMS

BACKGROUND OF THE INVENTION

1. Field of the Invention

The invention is related to signal/image processing and encoding. More specifically, the invention relates to architectures to execute signal/image processing functions.

2. Description of Related Art

Using traditional Fourier analysis (transforms), any signal can be approximated as a sum of sinusoidal waveforms of assorted frequencies. While Fourier transforms are ideally suited for signals having repeated behavior, such as in speech signals, it fails to efficiently approximate signals with sharp discontinuities such as the edge features in images, or signals encoded for digital communications. Therefore, in recent years, a new form of analysis, known as Wavelet analysis has been developed to better represent signals that have exaggerated and discontinuous features. A transform, similar to the Fourier transform, Discrete Wavelet Transform (DWT), based on Wavelet analysis, has been developed to represent signals with discontinuous features. The DWT may be a "discrete" algorithm, which indicates that rather than approximating a signal using continuous waveforms, the signal is approximated by discrete samples of waveform. Since the transform is discrete, the DWT can be implemented using digital logic such as Very Large Scale Integrated (VLSI) circuits and thus can be integrated on a chip with other digital components.

The essence of DWT is to decompose an input signal into two or more frequency sub-bands. An input signal may be decomposed into two outputs—a low frequency sub-band output obtained using a low-pass filter, and a high frequency sub-band output using a high-pass filter. Each of these sub-bands can be encoded separately using a suitable coding system. Each sub-band can further be divided into smaller and smaller sub-bands as is required. If an input signal is decomposed into two sub-bands, then to reconstruct the input signal, the VLSI architecture used must be able to receive two inputs and return one output. Fundamentally, therefore, the forward DWT transform, i.e., the transform performing the decomposition, is asymmetric to the inverse DWT transform, i.e., the transform performing the reconstruction since they require different numbers of inputs and outputs. Thus, traditional VLSI architectures for the DWT computation (decomposition and reconstruction) have two separate and distinct circuitry, one for the forward DWT and one for inverse DWT. The circuitry of such architecture is complicated further since the forward and inverse transforms use different filter coefficients and schedule (delay) certain inputs in differing stages of the computation.

To reduce the speed and cost of the forward DWT and inverse DWT transform, therefore, there is needed a single integrated architecture which can perform both the forward DWT transform and the inverse DWT transform without separate circuitry or processing elements. Further, the separate architectures for the forward DWT and inverse DWT if needed must also be reduced in complexity.

SUMMARY

The invention uses certain mathematical properties of filters used in the DWT computation as well as data parallelism in the DWT computation to provide an integrated systolic architecture for decomposing as well as recomposing signals approximated using the DWT.

The integrated architecture receives a single input bitstream when computing the forward DWT and two different input bitstreams when computing the inverse DWT. Using multiplexers, clock and control signals, the integrated architecture determines whether the forward or inverse DWT is to be computed and correspondingly activates appropriate processing elements as well as inputs and outputs. A unique feature of the architecture—a single set of five processing cells—can be used to perform both the forward DWT and inverse DWT thereby eliminating the need for separate processing cells for the forward and inverse DWT. Each of the five processing cells utilizes an adder and a multiplier and receives several operands in order to compute the DWT.

In computing the forward DWT, a single input sequence generates two decomposed output sequences. Conversely, when the integrated architecture is performing the inverse DWT, two input sequences generate a single reconstructed output sequence. According to a mathematical manipulation of the DWT function, in the forward DWT, four clock cycles are required to pass in order to initialize the set of five processing cells, after which, in all successive clock cycles, an input sequence is processed such that for every clock cycle, one input yields one output. The five processing cells of the integrated architecture are further coupled to an adder module and control circuit which generates the control signals required to tell the integrated architecture whether the forward DWT or the inverse DWT should be performed and computes the final stage in the mathematical algorithm dictated by the DWT computation.

The integrated architecture of the invention can be used in a variety of applications such as image compression or other image processing applications. In this regard, the one-dimensional DWT described above can be extended to two dimensions by using two one-dimensional DWT processing modules and a transpose circuit.

DETAILED DESCRIPTION OF THE INVENTION

Figure 1:
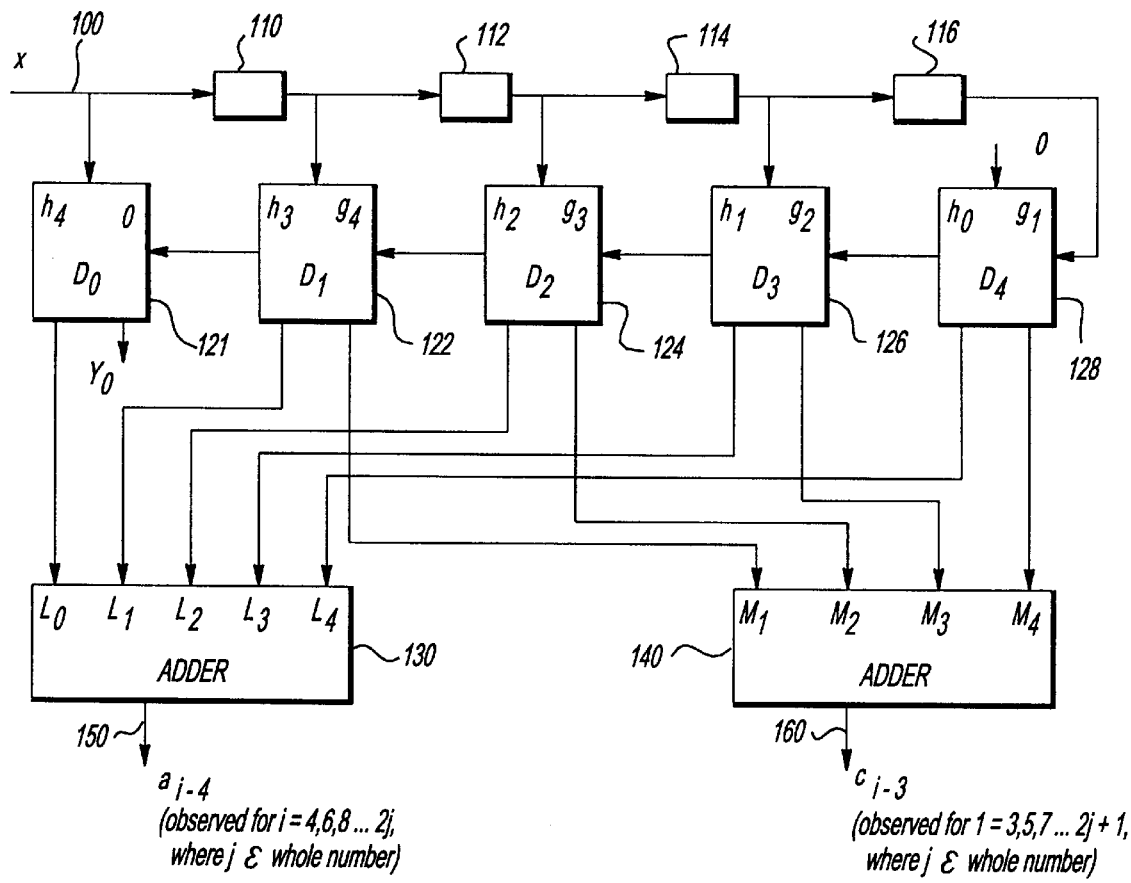
FIG. 1 shows a systolic array for computing a forward Discrete Wavelet Transform.

FIG. 1 shows a systolic array for computing a forward Discrete Wavelet Transform FIG. 1 shows an input xi 100 which is a single N-bit integer or floating point value from an input sequence representing discrete samples of an input signal that is to be encoded. Though not specifically mentioned, all inputs and outputs are of the precision/type of the input. Further, the various adders, multipliers and registers discussed can be readily designed by one skilled in the art depending upon the precision/type required. In order for the array shown in FIG. 1 to be initialized, inputs $x_1$, $x_2$, $x_3$, and $x_4$ must first propagate through the delay elements 110, 112, 114, and 116. Thereafter, for every $x_i$ 100 that is input, two outputs will be generated by the array. These two outputs are shown in FIG. 1 as $a_{i-4}$ 150, which is the low frequency sub-band (LFS) output and, $c_{i-3}$ 160, which is the high frequency sub-band (HFS) output.

Each of the basic processing cells which compose the array are comprised of an adder and a multiplier and produce two sets of intermediate outputs. The first set of intermediate outputs, $L_0$ from cell $D_0$ 121, $L_1$ from cell $D_1$ 122, $L_2$ from cell $D_2$ 124, $L_3$ from cell $D_3$ 126, and $L_4$ from cell $D_4$ 128, are added by adder 130 to generate the LFS values $a_{i-4}$ 150. Likewise, the second set of intermediate outputs, $M_1$ from cell $D_1$ 122, $M_2$ from cell $D_2$ 124, $M_3$ from cell $D_3$ 126, and $M_4$ from cell $D_4$ 128, are added together by adder 140 to generate the HFS values $c_{i-3}$ 160. To generate the first HFS output $c_0$, which occurs at i=3 (i=0,1,2 . . . ), the first four clock cycles and, consequently, the first three intermediate outputs, $L_1$, $L_2$, and $L_3$ are required. On the next clock cycle, at i=4, the LFS output $a_0$ will be generated and observed. Thus, the outputs $a_{i-4}$ 150 and $c_{i-3}$ 160 are observed alternately at the trailing edges of even and odd clock cycles. The architecture is therefore 100% utilized since, at every clock cycle, one output, either $a_{i-4}$ or $c_{i-3}$ is being generated. Though not shown in FIG. 1, a multiplexer with a clock (alternating sequence) as a control signal can be used to observe the alternating outputs in the proper sequence.

The architecture of the array shown in FIG. 1 is "systolic", i.e., repeated, in that each of the processing cells 121, 122, 124, 126 and 128 are composed of one adder and one multiplier and vary only in the value of the filter coefficients which may be stored in a programmable register or other memory.

Figure 2:
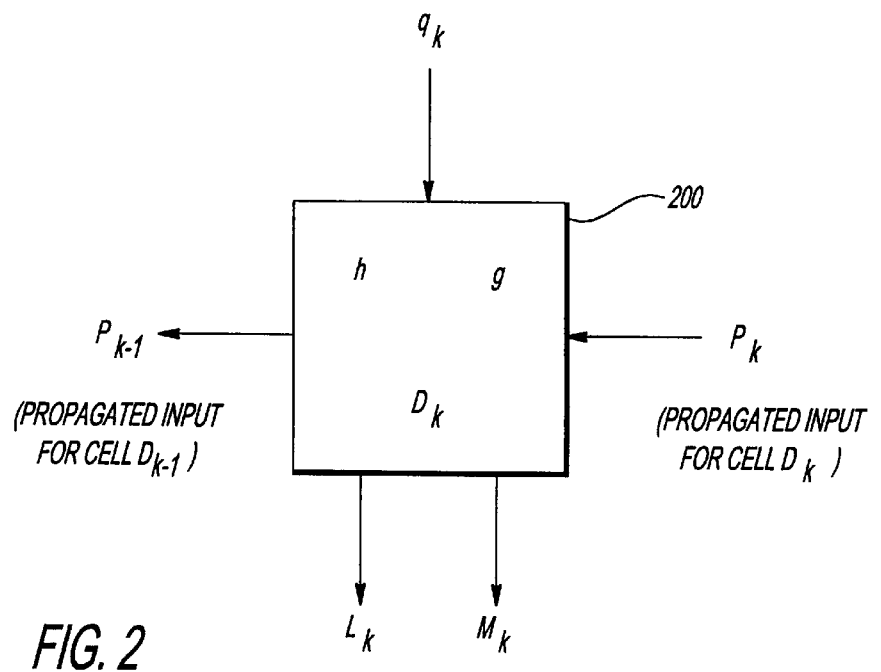
FIG. 2 illustrates the basic processing cell which is used in the DWT computation.

FIG. 2, which shows the basic processing cell $D_k$ 200, is first described to aid in understanding the array of FIG. 1. Referring to FIG. 2, given two filter coefficients, h and g, with h representing the high-pass coefficients and g representing low-pass coefficients, the intermediate output $L_k$ is computed by the following expression: $L_k=(p_k+q_k)*h$. Likewise, the intermediate output $M_k$ is computed by cell 200 according to the following expression: $M_k=(p_k+q_k)*g$. In the expressions for $L_k$ and $M_k$, the term $q_k$ represents the input data $x_i$ 100 which is the subject of the DWT, while the term $p_{n-1}$ refers to the input data $x_i$ 100 from the coupled processing cell from the previous clock cycle and $p_k$ the input data the current clock cycle, respectively. The input $p_k$ is passed through to output $p_{k-1}$ from a cell $D_k$ to the previous cell $D_{k-1}$ in the array. Thus the terms $p_k$ and $p_{k-1}$ will be referred to hereinafter as "propagated inputs."

The basic processing cell 200 of FIG. 2 may be repeatedly built and coupled to perform the forward DWT computation. The DWT is advantageous for compression since it is a "pyramid" algorithm. In a pyramid algorithm, for a one-dimensional Wavelet Transform, every other sample is thrown away or downsampled, and thus the data set is halved at each iteration. Thus, after J iterations of the FIG. 1 computation, the number of samples being manipulated shrinks by $2^J$. To compute a Wavelet Transform of a signal of N samples, the CPU cycle time required would amount to only K*N, where K is a constant determined by the Wavelet chosen (i.e., coefficients used).

The forward DWT computation, which is implemented by the architecture of the array in FIG. 1, can be represented by $a_n=\Sigma_K h_{2n-K}x_K$ (LFS outputs) and $c_n=\Sigma_K g_{2n-K}x_K$ (HFS outputs). The low-pass filter coefficients $h_i$ and the high-pass filter coefficients $g_i$ have certain symmetric properties which can be manipulated to implement the architecture shown in the array of FIG. 1. The filters used for the DWT may be IIR (Infinite Impulse Response) or FIR (Finite Impulse Response) digital filters, the design of which is well-known in the art. An optimal filter to use is a biorthogonal spline filter, which by its properties can simplify the computation. A biorthogonal spline filter has nine low-pass filter coefficients $h_{-4}$, $h_{-3}$, $h_{-2}$, $h_{-1}$, $h_0$, $h_1$, $h_2$, $h_3$, and $h_4$. The biorthogonal spline filter also has seven high-pass filter coefficients $g_{-2}$, $g_{-1}$, $g_0$, $g_{-1}$, $g_{-2}$, $g_3$, and $g_4$.

The LFS outputs are as follows:

$$a_0=h_0x_0+h_{-1}x_1+h_{-2}x_2+h_{-3}x_3+h_{-4}x_4,$$

$$a_1=h_2x_0+h_1x_1+h_0x_2+h_{-1}x_3+h_{-2}x_4+h_{-3}x_5+h_{-4}x_6,$$

$$a_2=h_4x_0+h_3x_1+h_2x_2+h_1x_3+h_0x_4+h_{-1}x_5+h_{-2}x_6+h_{-3}x_7+h_{-4}x_8,$$

$$a_{n/2-2}=h_4x_{N-8}+h_3x_{N-7}+h_2x_{N-6}+h_1x_{N-5}+h_0x_{N-4}+h_{-1}x_{N-3}+h_{-2}x_{N-2}+h_{-3}x_{N-1},$$

$$a_{n/2-1}=h_4x_{N-6}+h_3x_{N-5}+h_2x_{N-4}+h_1x_{N-3}+h_0x_{N-2}+h_{-1}x_{N-1}.$$

One property of the low-pass filter coefficients is that of symmetry such that $h_{-i}=h_i$. Thus, $h_{-1}=h_1$, $h_{-2}=h_2$, $h_{-3}=h_3$, $h_{-4}=h_4$ Thus, $a_1$ may be rewritten as:

$$a_1=h_0x_2+h_1(x_1+x_3)+h_2(x_0+x_4)+h_3x_5+h_4x_6.$$

Likewise, other LFS outputs may be conveniently re-arranged such that only one add and one multiply operation is required in each processing cell. The simplified LFS outputs after applying the symmetric filter properties for low-pass coefficients are as follows:

$$\begin{aligned}
a_0 &= h_0x_0 + h_1x_1 + h_2x_2 + h_3x_3 + h_4x_4 \\
&= h_0(x_0 + 0) + h_1(x_1 + 0) + h_2(x_2 + 0) + h_3(x_3 + 0) + h_4(x_4 + 0) \\
a_1 &= h_2x_0 + h_1x_1 + h_0x_2 + h_1x_3 + h_2x_4 + h_3x_5 + h_4x_6 \\
&= h_0(x_2 + 0) + h_1(x_1 + x_3) + h_2(x_0 + x_4) + h_3(x_5 + 0) + h_4(x_6 + 0) \\
a_2 &= h_0(x_4 + 0) + h_1(x_3 + x_5) + h_2(x_2 + x_6) + h_3(x_1 + x_7) + h_4(x_0 + x_8) \\
a_3 &= h_0(x_6 + 0) + h_1(x_5 + x_7) + h_2(x_4 + x_8) + h_3(x_3 + x_9) + h_4(x_2 + x_{10}) \\
a_4 &= h_0(x_8 + 0) + h_1(x_7 + x_9) + h_2(x_6 + x_{10}) + h_3(x_5 + x_{11}) + h_4(x_4 + x_{12})
\end{aligned}$$

The symmetry of the coefficients also reduces the total number of processing cells required so that an architecture like that of FIG. 1 may be used to compute the forward DWT. At the fourth clock cycle, where i=3, $a_{i-4}$ is ignored (skipped), and $c_0$ is instead observed after being computed, which is the first HFS output (see below for description).

At the fifth clock cycle, i=4, the $c_{i-3}$ 160 output is skipped and instead, the LFS output $a_{i-4}$ 150 is instead observed. Returning to the array of FIG. 1, $a_0$ is computed as follows. At i=4, the fifth clock cycle, cell $D_0$ 121 receives $x_4$, $D_1$ 122 receives $x_3$ (from previous cycle), $D_2$ 124 receives $x_2$, $D_3$ 126 receives $x_1$ and $D_4$ 128 receives 0 as their respective $q_i$ values. Also, at i=4, the propagated input pi for cell $D_4$ 128 is $x_0$. Since there is, by definition, no $x_{-1}$, $x_{-2}$, etc., cells $D_1$ 122 and $D_0$ 121 receive nulls or 0 values at i=4. Using the basic formula $L_i=(p_i+q_i)*h$ for each processing cell, we get from $D_0$ 121 the intermediate output $L_0=(0+x_4)*h_4$. Likewise, $D_1$ 122 generates $L_1=(0+x_3)*h_3$, $D_2$ 124 generates $L_2=(0+x_2)*h_2$, $D_3$ 126 generates $L_3=(0+x_1)*h_1$ and $D_4$ 128 generates $L_4=(x_0+0)*h_0$. Adder 130 computes the sum of $L_0$, $L_1$, $L_2$, $L_3$ and $L_4$ which yields the first output $a_0=x_0h_0+x_1h_1+x_2h_2+x_3h_3+x_4h_4$.

In the case for i=4, $D_3$ 126 receives no propagated input from $D_4$ 128 since $D_4$ 128 received no propagated input $q_i$ (referring to processing cell 200 description for FIG. 2) until i=4. Similarly, all the LFS outputs $a_{i-4}$ 150 and $c_{i-3}$ 160 may be computed. The processing cell 200 of FIG. 2 may also contain a latch register or other mechanism to hold propagated inputs before passing them to the next cell. One reasonably skilled in the art of digital design will readily be able to design/implement the add, multiply and delay elements required by the precision/value of the DWT inputs and outputs.

The HFS outputs are as follows:

$$c_0 = g_0x_0 + g_{-1}x_1 + g_{-2}x_2,$$

$$c_1 = g_2x_0 + g_1x_1 + g_0x_2 + g_{-1}x_3 + g_{-2}x_4,$$

$$c_2 = g_4x_0 + g_3x_1 + g_2x_2 + g_1x_3 + g_0x_4 + g_{-1}x_5 + g_{-2}x_6,$$

$$C_{n/2-2} = g_4x_{N-8} + g_3x_{N-7} + g_2x_{N-6} + g_1x_{N-5} + g_0x_{N-4} + g_{-1}x_{N-3} + g_{-2}x_{N-2},$$

$$c_{n/2-1} = g_4x_{N-6} + g_3x_{N-5} + g_2x_{N-4} + g_1x_{N-3} + g_0x_{N-2} + h_{-1}x_{N-1}.$$

The high-pass coefficients are also symmetric, but in a different sense. The inverse DWT low-pass filter coefficients are represented by $\bar{h}$. These inverse coefficients are symmetric such that $\bar{h}_n=\bar{h}_{-n}$. The high-pass forward DWT filter coefficients have the property $g_n=(-1)^n\bar{h}_{1-n}$. Since $\bar{h}_n=\bar{h}_{-n}$, also $g_n=(-1)^n\bar{h}_{n-1}$. Thus, for n=2, $g_2=h_1$, but also for n=0, $g_0=h_1$. Therefore, $g_2=g_0=\bar{h}_1$. Likewise, it can be shown that $g_{-2}=g_4=\bar{h}_3$ and $g_{-1}=g_3=\bar{h}_2$. Substituting these equations for the expanded $c_n$ yields, for instance, $c_2=g_1x_3+g_2(x_2+x_4)+g_3(x_1+x_5)+g_4(x_0+x_6)$. Thus, only the coefficients $g_1$, $g_2$, $g_3$ and $g_4$ are required to compute the HFS outputs $C_{i-3}$ 160. The symmetric property of biorthogonal spline filter coefficients allows a great reduction in computation, and consequently in the architecture required.

The simplified HFS outputs after applying the symmetric filter properties for high-pass coefficients are as follows:

$$\begin{aligned}
c_0 &= g_2x_0 + g_3x_1 + g_4x_2 \\
&= g_2(x_0 + 0) + g_3(x_1 + 0) + g_4(x_2 + 0) \\
c_1 &= g_2x_0 + g_1x_1 + g_0x_2 + g_{-1}x_3 + g_{-2}x_4 \\
&= g_1(x_3 + 0) + g_2(x_2 + x_0) + g_3(x_3 + 0) + g_4(x_4 + 0) \\
c_2 &= g_4x_0 + g_3x_1 + g_2x_2 + g_1x_3 + g_0x_4 + g_{-1}x_5 + g_{-2}x_6 \\
&= g_1(x_3 + 0) + g_2(x_4 + x_2) + g_3(x_5 + x_1) + g_4(x_6 + x_0) \\
c_3 &= g_4x_2 + g_3x_3 + g_2x_4 + g_1x_5 + g_0x_6 + g_{-1}x_7 + g_{-2}x_8 \\
&= g_1(x_5 + 0) + g_2(x_6 + x_4) + g_3(x_7 + x_3) + g_4(x_8 + x_2) \\
c_5 &= g_4x_4 + g_3x_5 + g_2x_6 + g_1x_7 + g_0x_8 + g_{-1}x_9 + g_{-2}x_{10} \\
&= g_1(x_7 + 0) + g_2(x_8 + x_6) + g_3(x_9 + x_5) + g_4(x_{10} + x_4)
\end{aligned}$$

The first clock cycle producing a valid HFS output is at i=3. At i=3, cell $D_1$ 122 receives as its $q_i$ the input value $x_2$ (delayed at i=2 or delay element 110), $D_2$ 124 receives $x_1$ and $D_3$ 126 receives $x_0$. $D_4$ 128 always receives a $q_i$ of 0. The propagated inputs $p_i$ at i=3 are all 0. Therefore, according to the basic formula $M_i=(p_i+q_i)*g$ (from FIG. 2), the intermediate outputs at i=3 are: $M=x_2g_4$, $M_2=x_1g_3$ and $M_3=x_0g_2$. The intermediate output $M_4$ is zero because both $q_1$ and $p_i$ inputs are 0 for cell $C_4$ 128. Adder 140 adds the intermediate outputs $M_1$, $M_2$, $M_3$ and $M_4$ to obtain a $c_0=x_0g_2+x_1g_3+x_2g_4$, which matches the first term for the simplified HFS output. At i=4, as mentioned when discussing the LFS output, the HFS output is ignored, not observed and instead, at i=5, the next HFS output $c_1$ is observed.

Table 1 below summarizes the intermediate outputs L and M, and final outputs $c_{i-4}$ and $a_{i-3}$ at each clock cycle for the forward DWT in the first eight clock cycles (i=0 to 7) and matches the above equations for the simplified outputs.

In Table 1 below, the bracketed form $\{rst\}$ represents $r*(s+t)$.

TABLE 1

| i | $(L_0,M_0)$ | $(L_1,M_1)$ | $(L_2,M_2)$ | $(L_3,M_3)$ | $(L_4,M_4)$ | $a_{i-4}$ 150 | $c_{i-3}$ 160 |
|---|---|---|---|---|---|---|---|
| 0 | $(h_4x_0,0)$ | $(0,0)$ | $(0,0)$ | $(0,0)$ | $(0,0)$ | not valid | not valid |
| 1 | $(h_4x_1,0)$ | $(h_3x_0,g_4x_0)$ | $(0,0)$ | $(0,0)$ | $(0,0)$ | not valid | not valid |
| 2 | $(h_4x_2,0)$ | $(h_3x_1,g_4x_1)$ | $(h_2x_0,g_3x_0)$ | $(0,0)$ | $(0,0)$ | not valid | not valid |
| 3 | $(h_4x_3,0)$ | $(h_3x_2,g_4x_2)$ | $(h_2x_1,g_3x_1)$ | $(h_1x_0,g_2x_0)$ | $(0,0)$ | not valid | $c_0$ |
| 4 | $(h_4x_4,0)$ | $(h_3x_3,g_4x_3)$ | $(h_2x_2,g_3x_2)$ | $(h_1x_1,g_2x_1)$ | $(h_0x_0,g_1x_0)$ | $a_0$ | not observed |
| 5 | $(h_4x_5,0)$ | $(h_3x_4,g_4x_4)$ | $(h_2x_3,g_3x_3)$ | $\{h_1x_2x_0,g_2x_2x_0\}$ | $(h_0x_1,g_1x_1)$ | not observed | $c_1$ |
| 6 | $(h_4x_6,0)$ | $(h_3x_5,g_4x_5)$ | $\{h_2x_4x_0,g_3x_4x_0\}$ | $\{h_1x_3x_1,g_2x_3x_1\}$ | $(h_0x_2,g_1x_2)$ | $a_1$ | not observed |
| 7 | $(h_4x_7,0)$ | $\{h_3x_6x_0,g_4x_6x_0\}$ | $\{h_2x_5x_1,g_3x_5x_1\}$ | $\{h_1x_4x_2,g_2x_4x_2\}$ | $(h_0x_3,g_1x_3)$ | not observed | $c_2$ |

Figure 3:
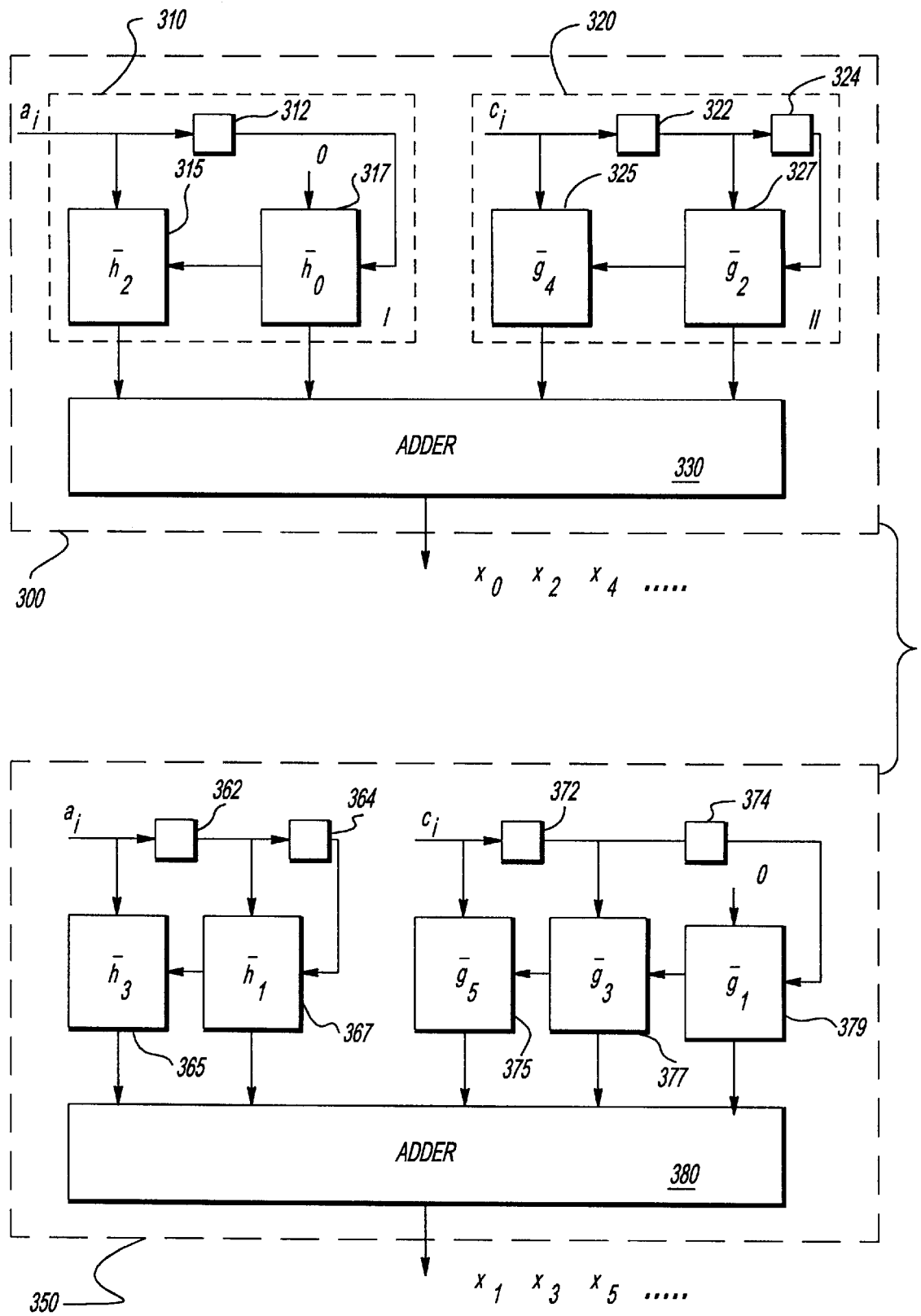
FIG. 3 shows a systolic architecture for computing an inverse Discrete Wavelet Transform.

FIG. 3 shows a systolic architecture for computing an inverse Discrete Wavelet Transform.

The reconstruction of the sequence $x_i$ is represented by the expression $x_i = \Sigma_n[\bar{h}_{2n-i}a_n + \bar{g}_{2n-i}c_n] = \Sigma_n \bar{h}_{2n-i}a_n + \Sigma_n \bar{g}_{2n-i}c_n$, where $a_n$ are the LFS outputs of the forward DWT and $c_n$ the HFS outputs. The inverse DWT has inverse high pass filter coefficients $\bar{g}$ and inverse low pass filter coefficients $\bar{h}$.

We can split the $x_i$ reconstruction into a sum of two summations:

$$x_i^{(1)} = \Sigma_n \bar{h}_{2n-i}a_n, \quad x_i^{(2)} = \Sigma_n \bar{g}_{2n-i}c_n.$$

The even terms of $x_i^{(1)}$ and $x_i^{(2)}$, i.e. $x_{2j}^{(1)}$ and $x_{2j}^{(2)}$ for $j=0, 1, \ldots, n/2-1$ using these filter coefficients are expanded as:

$$x_0^{(1)} = \bar{h}_0 a_0 + \bar{h}_2 a_1, \quad x_0^{(2)} = \bar{g}_0 c_0 + \bar{g}_2 c_1 + \bar{g}_4 c_2, \bar{g}_0 c_0 + \bar{g}_2 c_1 + \bar{g}_4 c_2,$$

$$x_2^{(1)} = \bar{h}_{-2} a_0 + \bar{h}_0 a_1 + \bar{h}_2 a_2, \quad x_2^{(2)} = \bar{g}_{-2} c_0 + \bar{g}_0 c_1 + \bar{g}_2 c_2 + \bar{g}_4 c_3,$$

$$x_4^{(1)} = \bar{h}_{-2} a_1 + \bar{h}_0 a_2 + \bar{h}_2 a_3, \quad x_4^{(2)} = \bar{g}_{-2} c_1 + \bar{g}_0 c_2 + \bar{g}_2 c_3 + \bar{g}_4 c_4,$$

$$\vdots$$

$$x_{n-6}^{(1)} = \bar{h}_{-2} a_{n/2-4} + \bar{h}_0 a_{n/2-3} + \bar{h}_2 a_{n/2-2}, \quad x_{n-6}^{(2)} = \bar{g}_{-2} c_{n/2-4} + \bar{g}_0 c_{n/2-3} + \bar{g}_2 c_{n/2-2} + \bar{g}_4 c_{n/2-1},$$

$$x_{n-4}^{(1)} = \bar{h}_{-2} a_{n/2-3} + \bar{h}_0 a_{n/2-2} + \bar{h}_2 a_{n/2-1}, \quad x_{n-4}^{(2)} = \bar{g}_{-2} c_{n/2-3} + \bar{g}_0 c_{n/2-2} + \bar{g}_2 c_{n/2-1},$$

$$x_{n-2}^{(1)} = \bar{h}_{-2} a_{n/2-2} + \bar{h}_0 a_{n/2-1}, \quad x_{n-2}^{(2)} = \bar{g}_{-2} c_{n/2-2} + \bar{g}_0 c_{n/2-1}.$$

The inverse filter coefficients like their forward counterparts have certain symmetric properties allowing some associative grouping. One property of the inverse high-pass coefficients is $\bar{g}_n = (-1)^n h_{1-n}$. Since $h_n = h_{-n}$, as discussed for FIG. 1, the inverse high-pass coefficients also have a property such that $\bar{g}_n = (-1)^n \bar{h}_{n-1}$. Thus, for $n=0$, $\bar{g}_0 = h_{-1}$. For $n=2$, since $\bar{g}_2 = h_1$ and $h_{-1} = g_0$, $\bar{g}_2 = \bar{g}_0$. Likewise, for $n=4$, $\bar{g}_4 = h_3 = \bar{g}_{-2}$. From the discussion of FIG. 1, the inverse low-pass coefficients have the property $\bar{h}_n = \bar{h}_{-n}$, such that $\bar{h}_2 = \bar{h}_{-2}$. Thus, the even-numbered outputs $x_{2j}$ require only four coefficients, $\bar{h}_0$, $\bar{h}_2$, $\bar{g}_2$ and $\bar{g}_4$ in order to be computed. Similarly, for odd-numbered outputs $x_{2j-1}$, it can be shown by the same filter properties discussed above that only five coefficients, $\bar{h}_3$, $\bar{h}_1$, $\bar{g}_5$, $\bar{g}_3$ and $\bar{g}_1$ are required.

The equations above show the complexity of the inverse DWT computation. The architecture for computing the inverse DWT consists of two input sequences $a_i$ and $c_i$, which represent the high-frequency sub-band and the low-frequency sub-band, respectively. Comparing FIG. 2 with FIG. 3, the DWT architecture is necessarily asymmetric since the forward architecture receives one input and produces two output sequences, whereas the inverse architecture receives two inputs and produces one output. This architecture is further complicated by the fact that the odd-numbered outputs, i.e., $x_1, x_3, x_5 \ldots$, require five processing cells, one for each coefficient, whereas the even-numbered outputs, i.e., $x_0, x_2, x_4 \ldots$, require only four processing cells. Moreover, the data flow for odd and even terms are not symmetric. The odd-numbered outputs are generated only odd clock cycles while even-numbered outputs are generated only on even clock cycles.

Thus, the inverse DWT architecture must be composed of two distinct blocks—an even output generating block 300 and an odd output generating block 350. Even output generating block 300 is further composed of two subcircuits—an even high frequency sub-band subcircuit (HFS) 310 and an even low frequency sub-band subcircuit (LFS) 320. Even HFS subcircuit 310 consists of two processing cells 315 and 317 each of which are composed of a multiplier and an adder. The processing cells 315, 317, 325 and 327 operate similar to the basic processing cell 200 shown in FIG. 2 except that each needs only one coefficient and consequently computes one intermediate rather than two. For instance, processing cell 315 outputs a term such that $a_i$ is first added to the propagated input from processing cell 317, with that sum multiplied by $\bar{h}_2$. Likewise for low frequency sub-band circuit 320, processing cell 325 outputs a term to adder/controller 330 which is the product of $\bar{g}_4$ and the sum of the input $c_i$ and the propagated input from processing cell 327. Processing cell 317 receives as one input 0 and as the other input $a_{i-1}$, since delay element 312 holds the value given it on the previous clock, transmitting it on the next clock cycle.

Even output generating block operates as follows. At i=0, $a_0$ is propagated to delay 312, and $c_0$ to delay 322. Though $a_0$ and $c_0$ are also input to cells 315 and 325, respectively, adder/controller 330 waits until the third clock cycle to output $x_0$ and have non-zero propagated inputs. At i=0, cells 317 and 327 have outputs of 0, since initial values released by delays 312, 324 and 322 are set at zero. At i=1, delay 312 releases $a_0$ to the $p_i$ input of cell 317 and $a_1$ is held at delay 312 and input to cell 315. As a result, cell 315 generates the term $\bar{h}_2 a_1$ and cell 317 generates $\bar{h}_0 a_0$. These outputs are sent to adder/controller 330 but are held (latched) until the next clock i=2. At i=1, though cells 325 and 327 generate the terms $c_1 \bar{g}_4$ and $c_0 \bar{g}_2$, respectively, these terms are ignored (cleared) by adder/controller 330 since according to the reconstruction formula, the first output $x_0$ requires a $c_2$ term.

At i=2, the third clock cycle, delay 324 releases $c_0$ to the $p_i$ (propagated) input of cell 327 and delay 322 releases $c_1$ to the $q_i$ input of cell 327 (for a description of $q_i$ and $p_i$, see FIG. 2 and associated text). Thus, cell 327 generates the term $(c_1+c_0)\bar{g}_2$. Cell 325 generates $c_2 \bar{g}_4$. As described earlier, the outputs of cells 315 and 317 from the previous clock were held at adder/controller 330 and are now summed, at i=2 with the terms generated by cells 325 and 327. Again, at i-2, even though cells 315 and 317 generate terms $(a_0+a_2)\bar{h}_2$ and $a_1 \bar{h}_0$, respectively, these terms are held one clock cycle. Instead, the i=2 outputs of cells 325 and 327 which are $c_2 \bar{g}_4$ and $(c_0+c_1)*\bar{g}_2$, respectively, are summed with the i=1 outputs of cells 315 and 317 which are $\bar{h}_0 a_0$ and $\bar{h}_2 a_1$. Hence, adder/controller 330 generates the first output $x_0 = \bar{h}_0 a_0 + \bar{h}_2 a_1 + c_0 \bar{g}_2 + c_1 \bar{g}_2 c_2 \bar{g}_4$.

Thus, for each clock cycle i, after i=2 (the third clock cycle), adder/controller 330 receives current outputs of subcircuit 320 and adds them to the previous clock's outputs from subcircuit 310. Additionally, adder/controller 330 receives the current output of subcircuit 310, holding them until the next clock cycle.

FIG. 3 also shows an odd output generating block 350 which requires five processing cells—365, 367, 375, 377 and 379. The processing cells 365, 367, 375, 377 and 379 operate similarly to the processing cell 200 shown in FIG. 2. The delay elements 362, 364, 372 and 374 hold their inputs for one clock cycle and release them on the next clock cycle. Each cell has an adder and multiplier and receives a propagated input from the cell to which it is connected.

Odd output generating block 350 operates as follows. At i=0, $a_0$ is propagated to cell 365 and is held on clock cycle at delay 362, while cell 375 receives $c_0$. At i-1, delay 362 releases $a_0$ to cell 367, while delay 372 release $c_0$ to cell 377. Also, at i=1 $a_1$ and $c_1$ are input to cells 365 and 375, respectively. At i=2, cell 365 receives $a_2$, cell 367 receives $a_1$ as its $q_i$ and receives $a_0$ as its $p_i$ input. Thus, cell 365 generates a term $a_2\bar{h}_3$ and cell 367 generates $(a_1+a_0)\bar{h}_1$. These outputs are sent to adder/controller 380 but are held for one clock cycle before being summed with the outputs of cells 375, 377 and 379. At i=2, the outputs of cells 375, 377 and 379 are ignored by adder/controller 380.

At i=3, $C_3$ is input to cell 375, cell 377 receives $c_2$ from the delay 372, cell 379 receives as propagated input $c_i$, and cell 377 receives as its propagated input, $c_0$. Thus, cell 375 generates the term $c_3\bar{g}_5$, cell 377 generates the term $(c_0+c_2)*\bar{g}_3$, and cell 379 generates $c_1\bar{g}_1$. These outputs are received by adder/controller 380 which adds the i=3 outputs of cells 375, 377 and 379 with the latched, i=2 outputs of cells 367 and 367 from the previous clock cycle. Hence, adder/controller 380 generates the second output (the first odd output) $x_1 = \bar{h}_1 a_0 + \bar{h}_1 a_1 + \bar{h}_3 a_2 + \bar{g}_3 c_0 + \bar{g}_3 c_2 + \bar{g}_5 c_3 + \bar{g}_1 c_1$.

Thus, for each clock cycle i, after i=3, (the fourth clock cycle), adder/controller 380 receives the current outputs of cells 375, 377 and 379 and adds them to the previous clock cycle's outputs of cells 365 and 367. Additionally, adder/controller 380 receives the current clock's outputs of cells 365 and 367 holding them until the next clock cycle.

FIGS. 1 and 3 show the complexity necessary to compute the DWT and inverse DWT. In an image processing chip, for instance, the circuitry should be capable of both the forward and inverse DWT. In addition to implementing biorthogonal spline filters for reducing and simplifying the forward and inverse DWT as shown in FIGS. 1 and 3, the invention also provides for an integrated architecture performing both.

Figure 4:
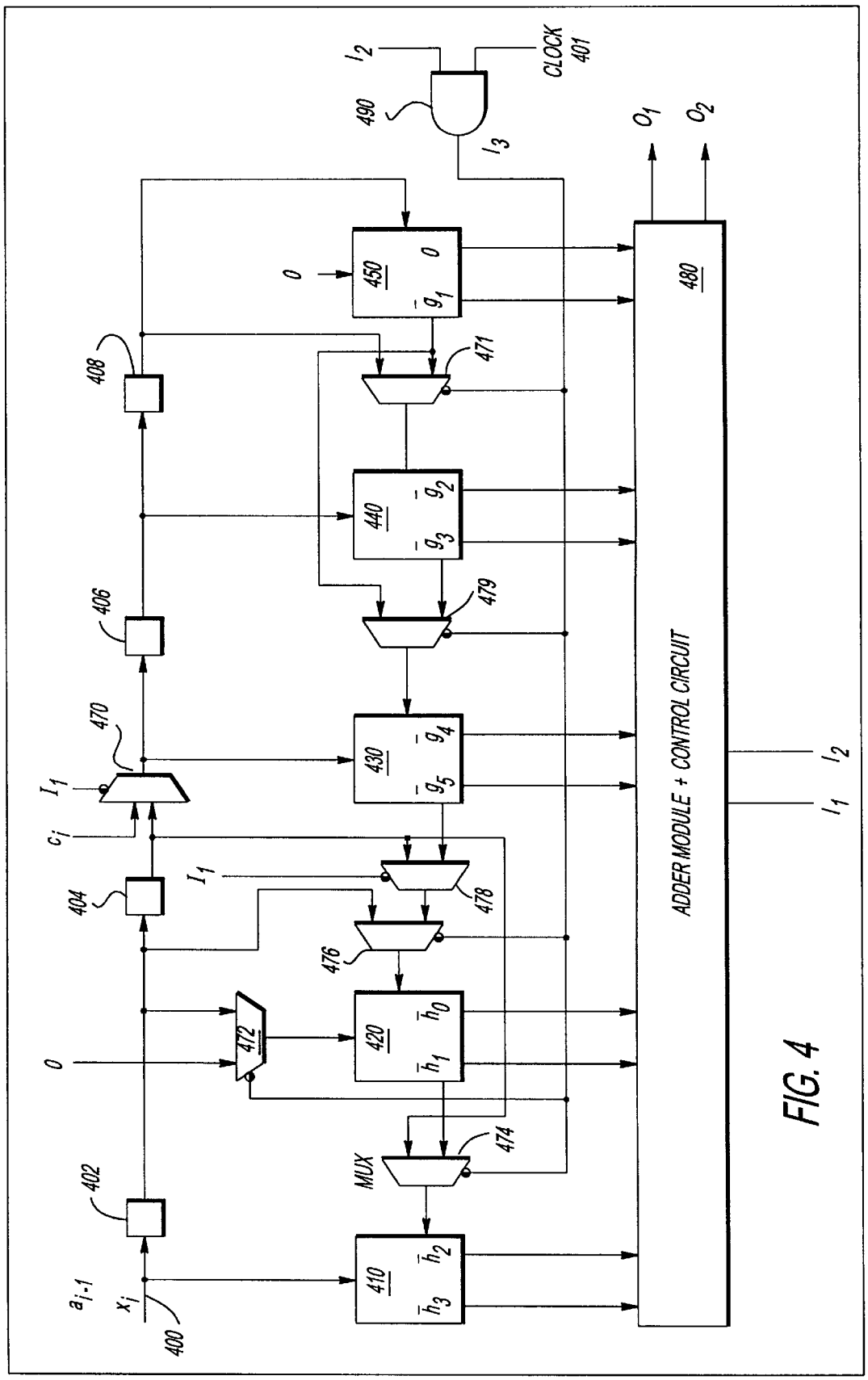
FIG. 4 shows a single integrated systolic architecture than can be used for both the forward Discrete Wavelet Transform and the inverse Discrete Wavelet Transform.

FIG. 4 shows a single integrated systolic architecture than can be used for both the forward Discrete Wavelet Transform and the inverse Discrete Wavelet Transform. The expressions described for the inverse DWT and forward DWT above are implemented in one integrated architecture. Thus, the description of FIG. 4 will concentrate on the architecture rather than mathematical properties which make an integrated architecture possible, since these properties have already been described.

FIG. 4 shows four control signals, a clocking signal 401, a selector signal $I_1$, selector signal $I_2$ and signal $I_3$. $O_1$ and $O_2$ are generated by an adder module and control circuit 480. Five processing cells—410, 420, 430, 440 and 450—each have an adder and multiplier (and registers storing the two coefficients). Each cell has the coefficients shown stored in registers or other such devices (e.g., $\bar{h}_3$ and $\bar{h}_2$ for cell 410). Input line L is coupled via multiplexers and delays to each of the processing cells. The integrated architecture has a delay element 402, multiplexer (MUX) 472, delay element 404, MUX 476, MUX 470, delay element 406, MUX 471 and delay element 408 coupled to line 400. Also shown are a MUX 478, MUX 479, MUX 474, an input line 400, and two output lines $O_1$ and $O_2$.

The control line $I_1$ and $I_2$ are both at a low logic level when the architecture is to function as a forward DWT circuit. During the forward DWT, the input line 400 is sending values corresponding to input samples prior to decomposition. Delay elements 402, 404, 406 and 480 hold samples from the input line 400 for one clock and then release them on the next clock. For MUX 478 and 470, the select line/control signal is $I_1$. When $I_1=0$, MUX 470 selects line 400 rather than the input $c_i$ and MUX 478 selects the propagated input from cell 430. For MUX 472, 474, MUX 476, MUX 479 and MUX 471, $I_3$ is the select line or control signal.

When $I_3$ is low (0), MUX 472 selects input line 400, MUX 474 selects the propagated input from cell 420, MUX 476 selects the input from the output of MUX 478, MUX 479 selects the propagated input output by cell 440 and MUX 471 the propagated input output by cell 450. In the forward DWT mode, therefore, the circuit functions similar to the array shown in FIG. 1. Even though there are nine (both high-pass and low-pass), forward DWT filter coefficients and nine inverse DWT filter coefficients, due to the symmetry properties discussed above, the architecture can be simplified to a total of nine coefficients (both low and high pass). With only nine coefficients, only five basic processing cells such as that shown in FIG. 2, are needed to compute the forward and inverse DWT on the integrated architecture.

In the inverse DWT computation, referring to FIG. 3, it has been shown that two input sequences $a_i$ and $c_i$ generate one output sequence $x_i$ which is the reconstructed original sample. However, FIG. 3 also shows that odd and even numbered outputs are computed separately, and observed on alternating clock cycles. Thus, in FIG. 4, the output $x_{2j+1}$, representing the odd-numbered outputs is observed on the $O_1$ terminal, and the even-numbered outputs are observed on the $O_2$ terminal. For the inverse DWT, $I_1$ and $I_2$ are both set to one. When the clock cycle is low, $I_3$, after a certain delay, is also low (since $I_2$ is high, the output of AND gate 490 ($I_3$) is also high, subject to the propagation delay through gate 490).

When $I_3$ is high, MUX 471 selects input line 400, MUX 479 selects the propagated input output by cell 450, MUX 476 selects the input line 400 as does MUX 474, and MUX 472 selects 0. In the inverse DWT mode, line 400 now propagates $a_{i-1}$ rather than $x_i$. In inverse DWT mode, $I_1=1$ (is always high), and as a result, MUX 470 selects the input $c_i$ and MUX 478 selects the input line 400 (after delay element 404). Utilizing these control signals and multiplexers, the architecture of FIG. 4 is capable of functioning as an inverse DWT (shown in FIG. 3) or a forward DWT (shown in FIG. 1). No complex "scheduling" of input and intermediate outputs is required as in traditional architectures and for every clock, an output is produced at terminals $O_1$ and $O_2$.

Figure 5:
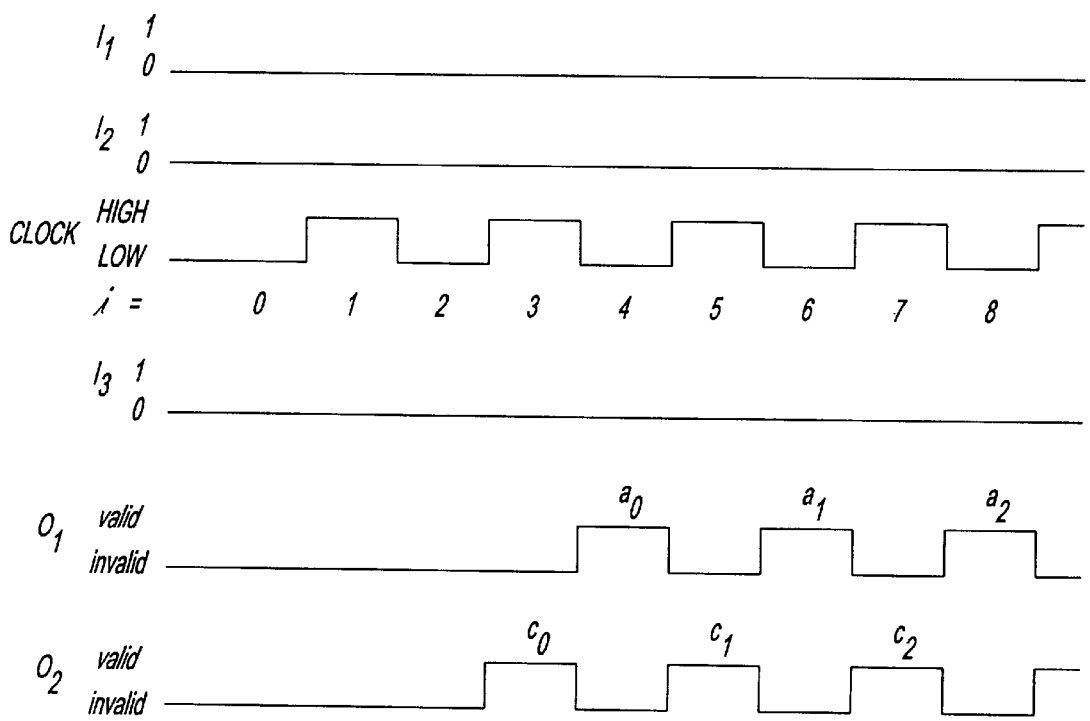
FIG. 5 shows a timing diagram of control signals, clocking signals and output terminals for the integrated architecture of FIG. 4 when operating in the forward DWT mode.

FIG. 5 shows a timing diagram of control signals, clocking signals and output terminals for the integrated architecture of FIG. 4 when operating in the forward DWT mode.

Referring to FIG. 5, the $I_1$ control signal is set to 0 for all clock cycles during the forward DWT mode. Also, the $I_2$ control signal is set to 0 for all clock cycles in the forward DWT mode. FIG. 5 also shows a clock signal generated by a clocking mechanism wherein the first half of the first clock cycle is represented by an i value of 0 (low state) and the second half of the first clock cycle by an i value of 1 (high state) and the first half of the second clock cycle by an i value of 2 transitions again to a low state. The clock signal is input to an AND gate along with the $I_2$ signal which generates an output signal $I_3$. Since $I_2$ is always 0 for all clock cycles, $I_3$ is also always 0 during the forward DWT mode. FIG. 5 also shows the two output terminals $O_1$ and $O_2$ of FIG. 4. Output terminal $O_1$ does not show a valid output until the first half of the third clock cycle, when i=4, whereupon $O_1$ returns a value $a_0$. On the second half of the third clock cycle, at i=5, the output terminal $O_1$ does not return a valid value for the output sequence $a_n$. Rather, on this half of the clock cycle, the output terminal $O_2$ returns a valid value for $c_1$. As can be seen from FIG. 5, neither of the output terminals $O_1$ or $O_2$ return a valid value until i=3, whereupon output terminal $O_2$ returns $c_0$. Starting with the second half of the second clock cycle (i=3), the output terminals $O_1$ and $O_2$ alternatingly produce valid values with $O_1$ producing the sequence $a_n$ and $O_2$ producing the sequence $c_n$.

Figure 6:
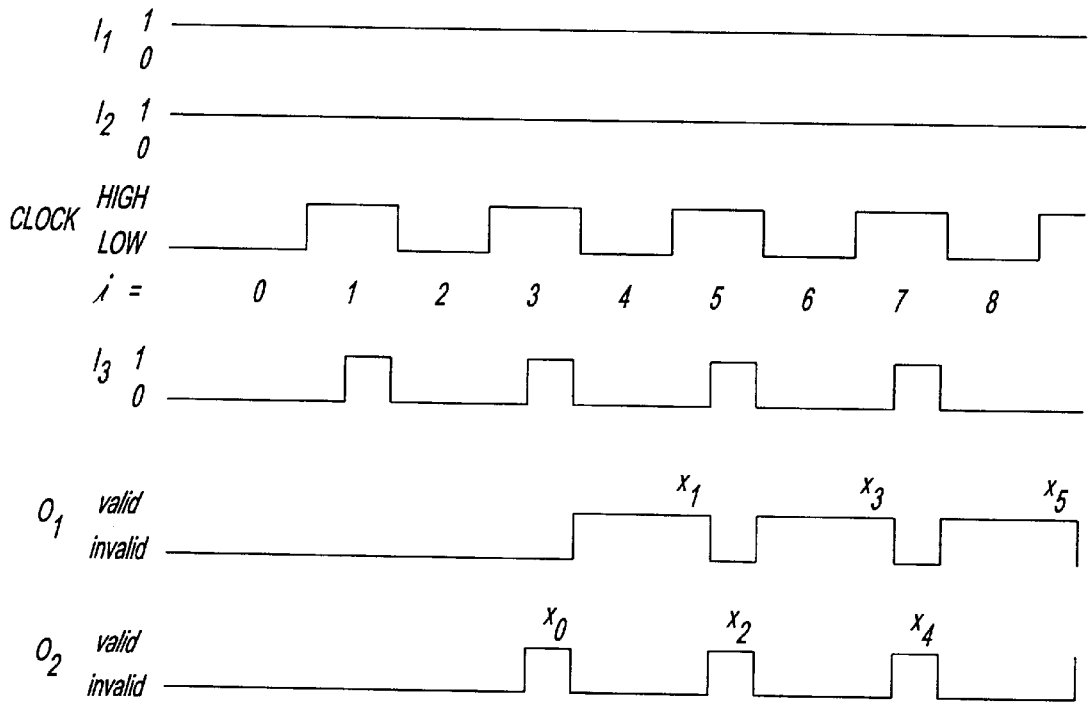
FIG. 6 shows a timing diagram of control signals, clocking signals and output terminals for the integrated architecture of FIG. 4 when operating in the inverse DWT mode.

FIG. 6 shows a timing diagram of control signals, clocking signals and output terminals for the integrated architecture of FIG. 4 when operating in the inverse DWT mode.

In the inverse DWT mode, the control signal $I_1$ is always set to 1 as is the control signal $I_2$. $I_2$ and the clocking signal are both input to an AND gate to generate the control signal $I_3$. Due to the delay of propagating through the AND gate, the signal $I_3$ is not coincident with the clocking signal, but is slightly delayed on its trailing edge. Since the even and odd reconstructed output sequences computed from the inverse DWT are very different in characteristic (see FIG. 3 and associated description) the odd numbered outputs $x_1$, $x_3$, $x_5$, etc. are observed on output terminal $O_1$, whereas the even numbered output sequences $x_0$, $x_2$, $x_4$, etc. are observed on output terminal $O_2$. When $I_3$ is high, the output terminal $O_2$ generates the even numbered output terms for the sequence for the reconstructed input sequence and, when $I_3$ is low, the output terminal $O_1$ generates the odd numbered outputs of the reconstructed input sequence. As described earlier, the first valid output $x_0$ is observed on terminal $O_2$ only starting with the second half of the second clock cycle, where i=3. On the next half clock cycle at i=4, output terminal $O_1$ generates a valid term $x_1$, while the output terminal $O_2$ produces an invalid value. Thus, on alternating half clock cycles starting with i=3, the output terminals $O_1$ and $O_2$ combined generate the entire reconstructed input sequence $x_n$.

Figure 7:
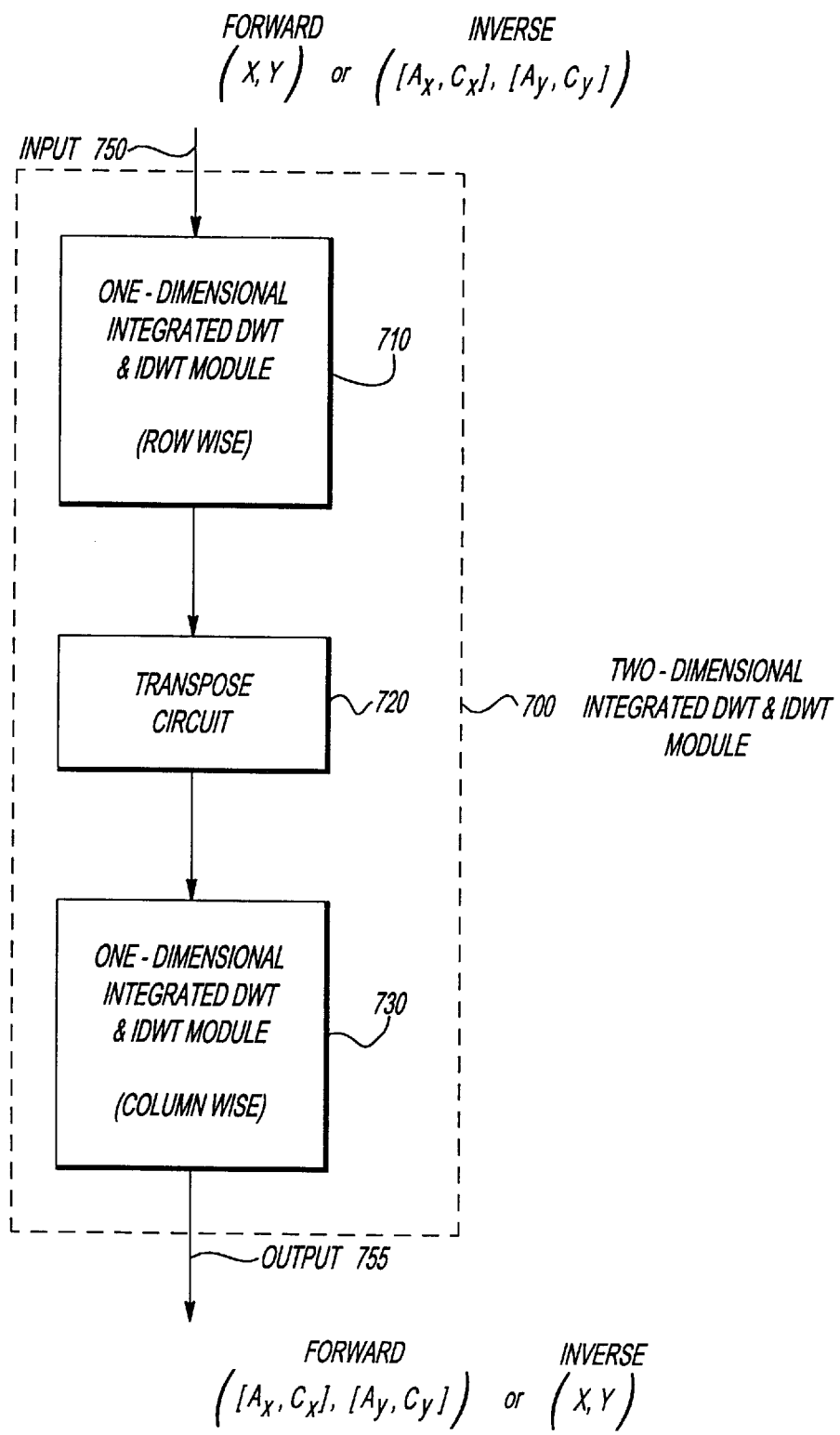
FIG. 7 shows the construction of a two-dimensional integrated Discrete Wavelet Transform and inverse Discrete Wavelet Transform module.

FIG. 7 shows the construction of a two-dimensional integrated Discrete Wavelet Transform and inverse Discrete Wavelet Transform module.

The two-dimensional integrated module 700 shown in FIG. 7 is the extension of the one-dimensional integrated architecture of FIG. 4 for a two-dimensional case such as an image compression. FIG. 7 shows within the integrated module 700 a row-wise one-dimensional integrated module 710 and a column-wise one-dimensional integrated module 730. Each of these integrated modules operate similar to the integrated architecture shown in FIG. 4, in that they are both capable of constructing a forward Wavelet Transform for a single input sequence x and the inverse Discrete Wavelet Transform for reconstructing the input sequence x based upon high-frequency sub-band inputs and low frequency sub-band inputs. A transpose circuit 720 is coupled between the integrated module 710 and the integrated module 730 to rearrange the data by transposing the matrix.

In the forward Discrete Wavelet Transform case, the input 750 is a single input sequence which is indexed by both x and y coordinates. In the forward case, this input 750 is transformed by the two-dimensional integrated module 700 into an output 755 which consists of a low frequency sub-band output sequence A which is indexed by its x and y coordinates (shown as $A_x$ and $A_y$ in FIG. 7) and a high frequency sub-band output sequence C also indexed by its x and y coordinates (shown as $C_x$ and $C_y$ in FIG. 7). In the inverse DWT case, the integrated module 700 receives via input 750 a low frequency sub-band input sequence A indexed by its x and y coordinates and a high frequency sub-band input sequence C also indexed by its x and y coordinates. This input 750 in the inverse DWT case generates an output 755 which is a single output sequence which consists of the reconstructed input sequence indexed by both its x and y coordinates. For image compression, the forward DWT case corresponds to the compression of the image while the inverse DWT case corresponds to the decompression of the image.

Figure 8:
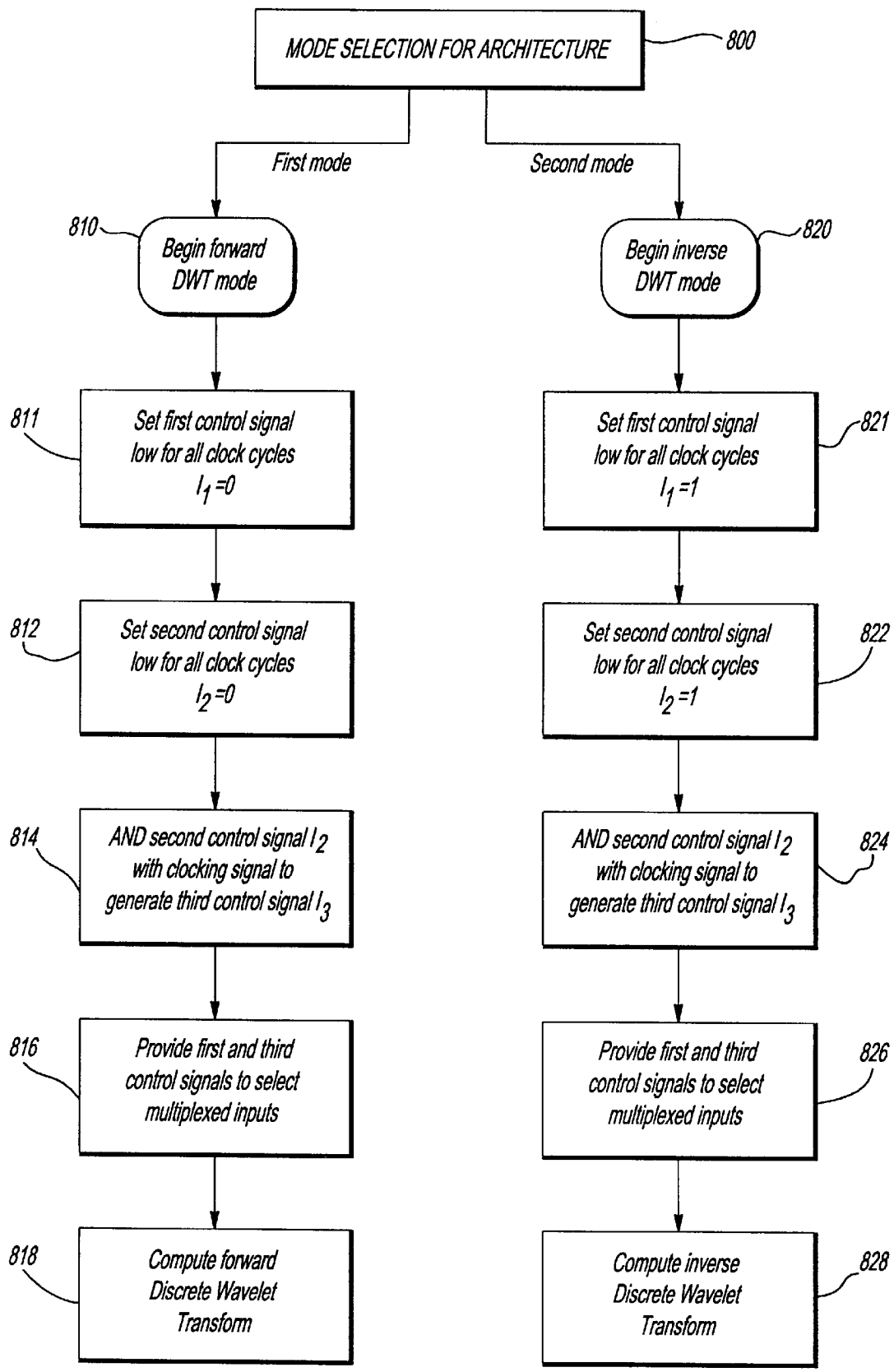
FIG. 8 is a flowchart of the basic method of integrating forward and inverse DWT in a single architecture.

FIG. 8 is a flowchart of the basic method of integrating forward and inverse DWT in a single architecture.

At step 800, mode selection for the architecture determines whether a first mode, the forward DWT, is required or the second mode, the inverse DWT, is required. In an image processing application, some switch/toggle may perform this selection based on whether compression or decompression is to be performed.

If the first mode is selected, the architecture will begin to perform the forward DWT (step 810). For the forward DWT mode as shown in FIG. 5, a first control signal $I_1$ is set low or a value of 0 (step 811). A second control signal $I_2$ is also set low or a value of 0 (step 812). Next, the second control signal is propagated as one input of a two input AND gate, while the clocking signal itself is the other input. This generates a third control signal $I_3$ (step 814). The first and third control signals, $I_1$ and $I_3$ are provided to multiplexers to select the appropriate inputs of those multiplexers when computing the forward DWT (step 816). Finally, according to step 818, the forward DWT is computed to completion.

If the second mode is selected, the architecture will begin to perform the inverse DWT (step 820). For the inverse DWT mode as shown in FIG. 6, a first control signal $I_1$ is set high or a value of 1 (step 821). A second control signal $I_2$ is also set high or a value of 1 (step 822). Next, the second control signal is propagated as one input of a two input AND gate, while the clocking signal itself is the other input. This generates a third control signal $I_3$ (step 824). The first and third control signals, $I_1$ and $I_3$ are provided to multiplexers to select the appropriate inputs of those multiplexers when computing the inverse DWT (step 826). Finally, according to step 828, the inverse DWT is computed to completion.

The above flowchart shows that by multiplexing inputs and controlling the selection of the multiplexed inputs depending on the mode selected, a single architecture can be used to compute both the forward and inverse DWT. Not shown in the flowchart of FIG. 8, is that the computing steps 818 and 828 utilizes biorthogonal spline filter coefficients as a basis for computing the forward and inverse DWT, respectively. Also, symmetry properties of these filter coefficients are used to reduce the output equations for compute both inverse and forward DWT, with these coefficients being supplied to processing cells of the architecture. The multiplexers allow selective coupling of the processing cells in order to compute the forward and inverse DWT.

In the foregoing specification, the invention has been described with reference to specific exemplary embodiments thereof. It will however be evident that various modifications and changes may be made thereto without departing from the broader spirit and scope of the invention as set forth in the appended claims. The specification and drawings are accordingly to be regarded as illustrative rather than restrictive.

What is claimed is:

1. A systolic array for computing a forward Discrete Wavelet Transform of an input datastream, said array comprising:

a plurality of processing cells, each cell computing an intermediate output x and an intermediate output y, said output x a function of low-pass digital filter coefficients, said output y a function of high-pass digital filter coefficients;

an adder and controller coupled to said plurality of processing cells selectively adding said outputs x to generate low-frequency sub-band outputs of said Discrete Wavelet Transform, said adder/controller selectively adding said output y to generate high-frequency sub-band outputs of said Discrete Wavelet Transform; and delay elements coupled to said processing cells selectively delaying values of said datastream to said processing cells to the Discrete Wavelet Transform.

2. A systolic array according to claim 1 wherein each of said high-pass filter coefficients and said low-pass filter coefficients are symmetric, said symmetry reducing the number of processing cells required to compute said Discrete Wavelet Transform.

3. A systolic array according to claim 1 wherein each processing cell receives propagated input, each said cell adding said propagated input and values of said input datastream, each said cell multiplying the sum by said filter coefficients.

4. A systolic array according to claim 3, wherein each cell is composed of an adder and a multiplier.

5. A systolic array according to claim 1, wherein said digital filter coefficients are biorthogonal spline filter coefficients.

* * * * *